(12) United States Patent
Martin et al.

(10) Patent No.: US 12,360,680 B2
(45) Date of Patent: Jul. 15, 2025

(54) READ SKEW BASED DATA THEFT MITIGATION

(71) Applicant: Dell Products L.P., Round Rock, TX (US)

(72) Inventors: Owen Martin, Hopedale, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 18/143,395

(22) Filed: May 4, 2023

(65) Prior Publication Data

US 2024/0370179 A1    Nov. 7, 2024

(51) Int. Cl.
*G06F 12/00*     (2006.01)
*G06F 3/06*      (2006.01)

(52) U.S. Cl.
CPC ............ *G06F 3/0619* (2013.01); *G06F 3/061* (2013.01); *G06F 3/0653* (2013.01); *G06F 3/067* (2013.01)

(58) Field of Classification Search
CPC ...... G06F 3/0619; G06F 3/061; G06F 3/0653; G06F 3/067

USPC ......................................................... 711/154
See application file for complete search history.

(56) References Cited

U.S. PATENT DOCUMENTS

| | | | | |
|---|---|---|---|---|
| 3,681,693 | A * | 8/1972 | Hsueh | G06K 7/016 368/120 |
| 8,433,848 | B1 * | 4/2013 | Naamad | G06F 3/0605 711/114 |
| 2022/0398038 | A1 * | 12/2022 | Anchi | G06F 3/0611 |
| 2023/0120010 | A1 * | 4/2023 | Patel | G06F 12/0802 711/118 |

OTHER PUBLICATIONS

Anti-SKew: Single-Key Data Skew Mitigation for MapReduce; Yue Chen (Year: 2015).*

* cited by examiner

*Primary Examiner* — Mardochee Chery
(74) *Attorney, Agent, or Firm* — Krishnendu Gupta; Nikhil Patel (57) ABSTRACT

One or more aspects of the present disclosure relate to read-skew-based data theft mitigation. In embodiments, an input/output (IO) workload is received at a storage array. Further, access to a logical device can be controlled based on at least one read capacity skew forecast corresponding to the logical device.

16 Claims, 5 Drawing Sheets

READ SKEW BASED DATA THEFT MITIGATION

BACKGROUND

A storage array performs block-based, file-based, or object-based storage services. Rather than store data on a server, storage arrays can include multiple storage devices (e.g., drives) to store vast numbers of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to read-skew-based data theft mitigation. In embodiments, an input/output (IO) workload is received at a storage array. Further, access to a logical device can be controlled based on a read capacity skew forecast corresponding to the logical device.

In embodiments, activity trends of the logical device can be determined based on historical and current access requests of the logical device.

In embodiments, a last-read time of each extent of the logical device can be identified. For example, the extent can include at least one track of address spaces corresponding to the logical device.

In embodiments, the last-read time of each extent can be grouped into time-range bins corresponding read access times of the logical device.

In embodiments, a read capacity skew of the logical device can be determined during at least one interval.

In embodiments, the read capacity skew forecast can be generated based on the logical device's historical and current read capacity skews.

In embodiments, the read capacity skew forecast can be generated based on a time series decomposition of historical and current read capacity skews corresponding to the logical device.

In embodiments, a forecast confidence of the read capacity skew forecast can be established for the at least one interval.

In embodiments, a read skew threshold can be dynamically generated based on the forecast confidence.

In embodiments, a current read skew of the logical device can be identified. Additionally, the logical device can be disabled if the current read skew exceeds the read skew threshold.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large numbers of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In some circumstances, a business can implement a storage array network (SAN) architecture to provide storage array services for its employees and business applications. Specifically, the SAN can include a wide area network (WAN) like the Internet. However, such networked storage solutions are prime targets of malicious actors (e.g., hackers) that can steal data from a networked storage array. Further, data theft can be challenging to detect. For example, data theft can occur without data loss and using valid authentication credentials (e.g., username and password). Specifically, a malicious actor can include a business insider (e.g., an employee) or an external actor that obtains an employee's authentication credentials.

Embodiments of the present disclosure relate to read skew data theft detection. For example, the embodiments can use a machine learning (ML) technique to generate address space models of active address spaces corresponding to a logical storage array device. The embodiments can identify trends and patterns corresponding to the active address spaces using the address space models. Accordingly, the embodiments can identify address space activity inconsistent with the identified trends and patterns. Further, the embodiments can perform a data theft mitigation action based on any identified address space activity inconsistent with the identified trends and patterns described in greater detail herein.

Figure 1:
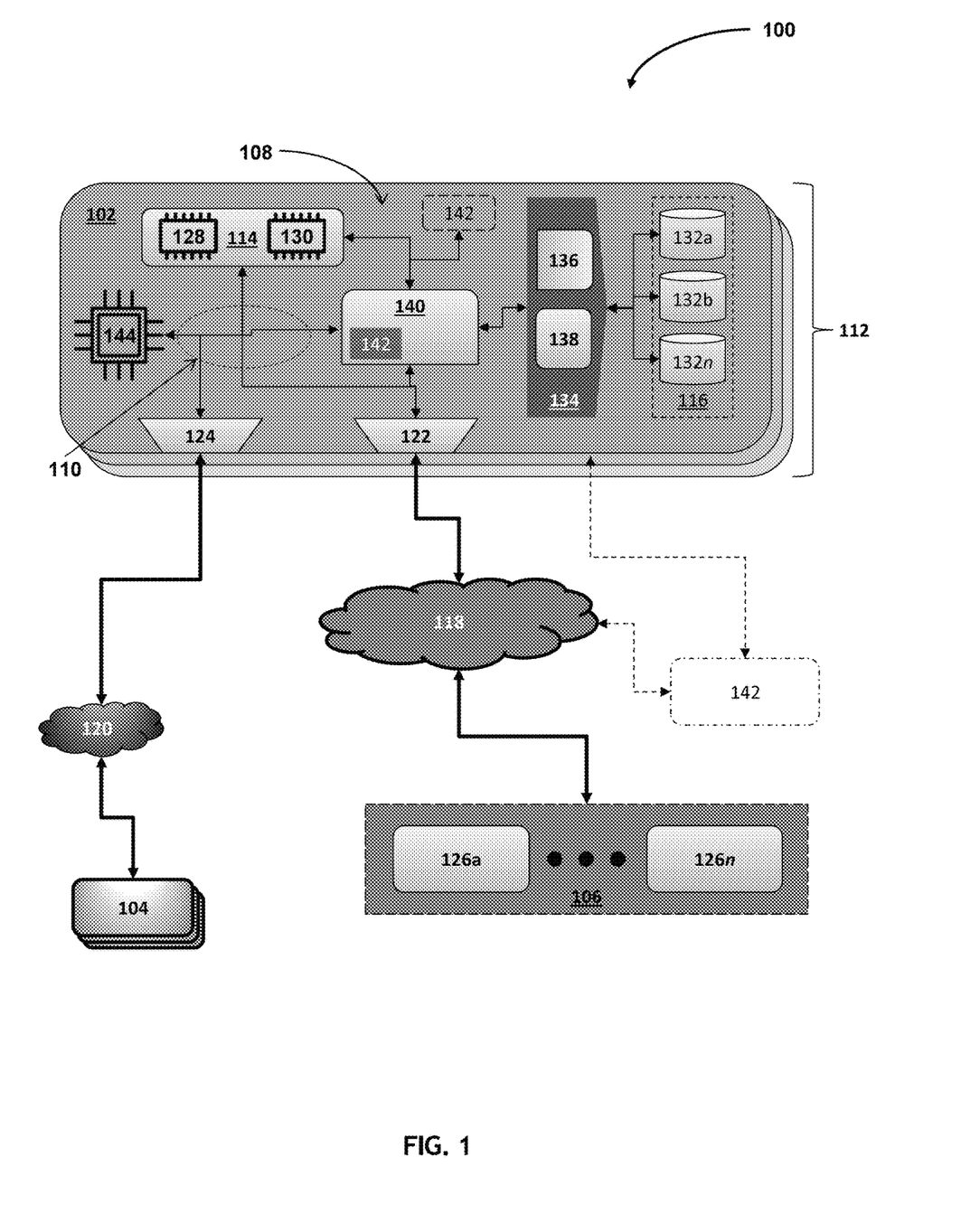
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 1A:
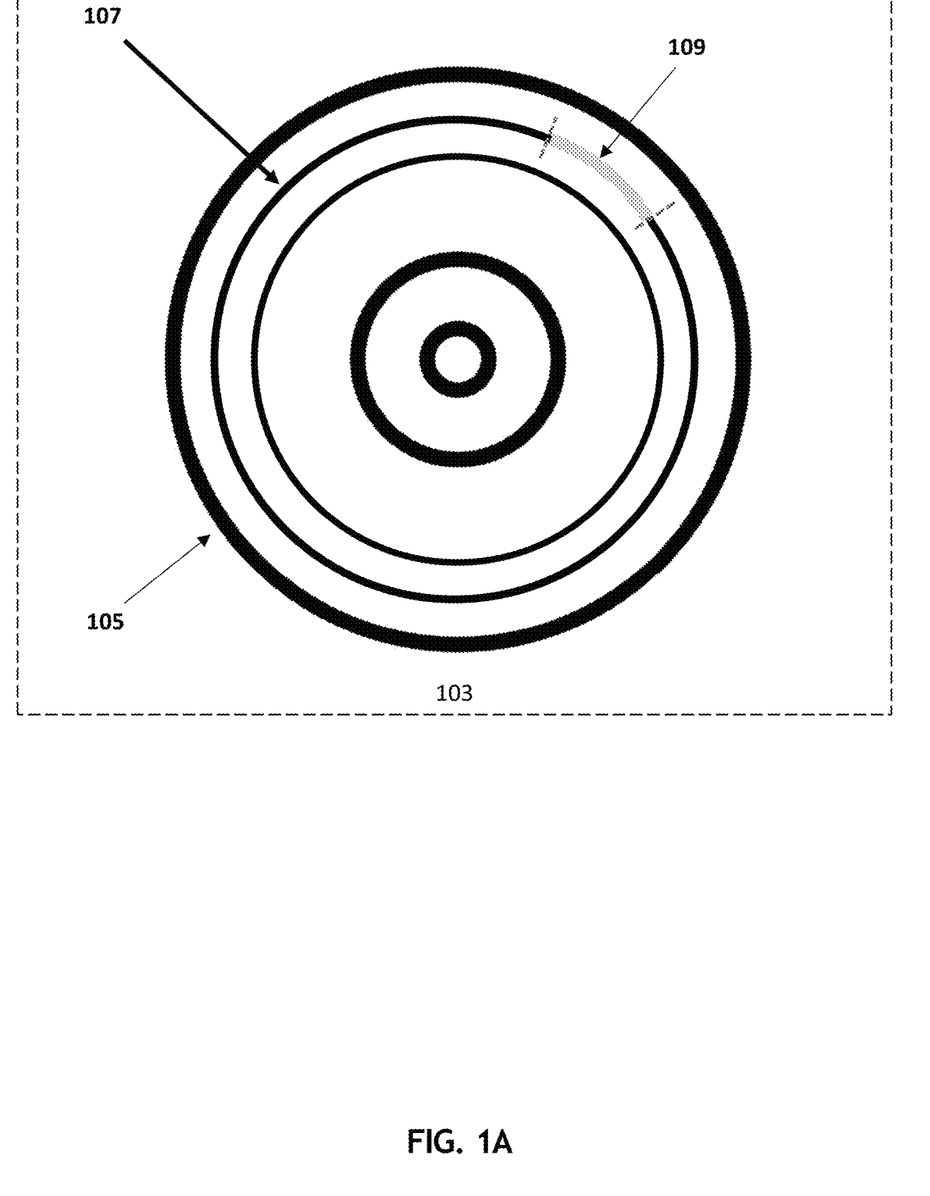
FIG. 1A is a cross-sectional view of a storage device in accordance with embodiments of the present disclosure.

Regarding FIG. 1A, the persistent storage 116 can include an HDD 103 with stacks of cylinders 105. Like a vinyl record's grooves, each cylinder 105 can include one or more tracks 107. Further, each track 206 can include a set of sectors (e.g., track slices or portions) 109. Additionally, each sector 1098 can include a set of physical address blocks.

In embodiments, the EDS can establish a logical block address (LBA) corresponding to each physical address block. Accordingly, a continuous set of LBAs can form a logical sector corresponding to a physical sector (e.g., sector 109 of a storage device 132a-n). Further, the EDS 140 can group several logical sectors to establish a logical track. Thus, a logical track can include physical address blocks from several storage devices 132a-n. Additionally, each logical track can include a unique identifier (ID), e.g., a track ID (TID). Thus, the EDS 140 can logically group one or more logical tracks using their respective TIDs to establish a logical device (e.g., virtual device or volume) with a unique device ID. Furthermore, the EDS 140 can logically group a logical device's tracks to establish one or more extents with unique extent IDs.

Figure 2:
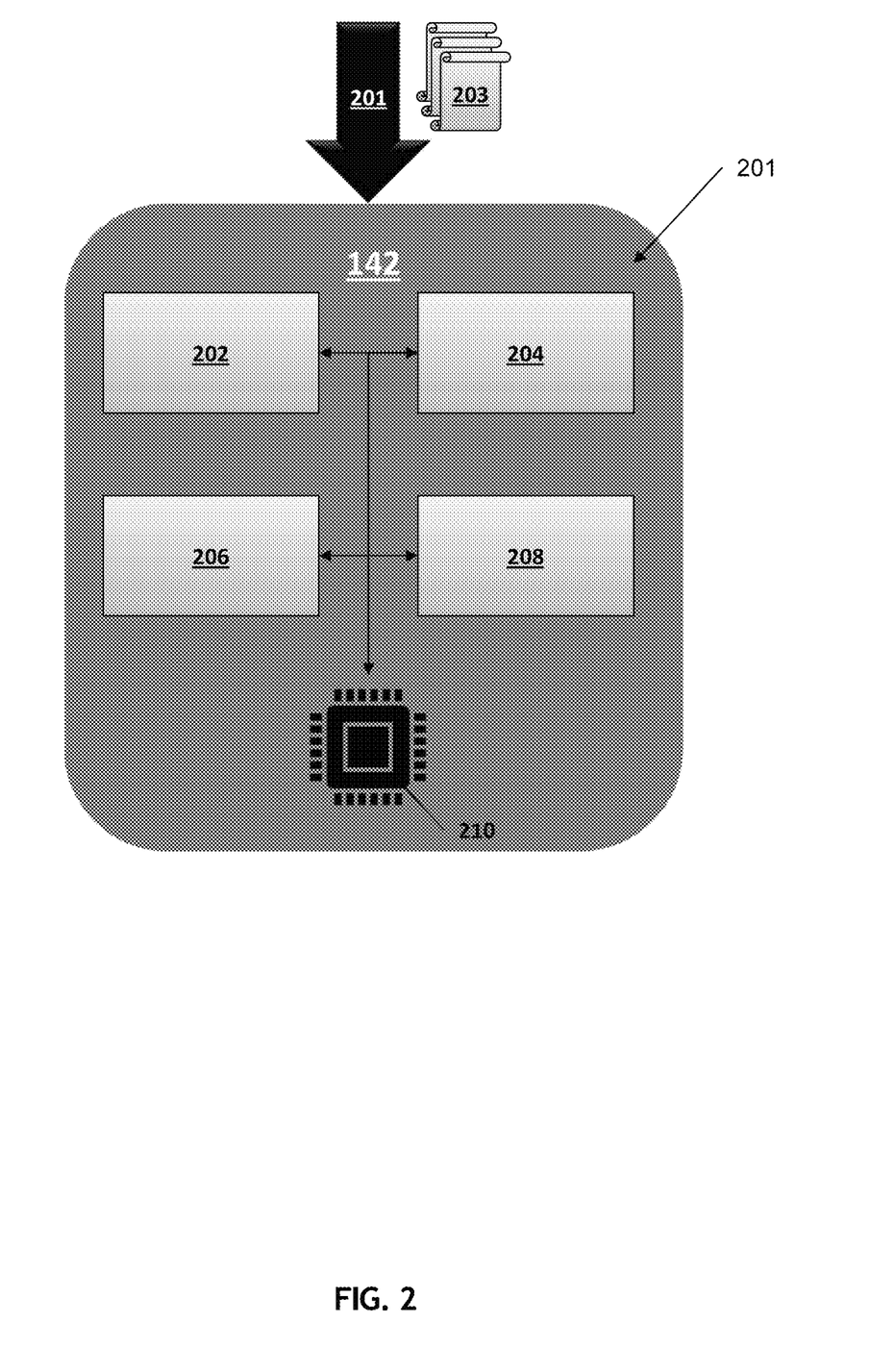
FIG. 2 is a block diagram of a controller in accordance with embodiments of the present disclosure.

Regarding FIG. 2, a controller (e.g., a data theft controller) 142 can include logic, circuitry, and hardware 201 configured to perform data theft mitigation services.

In embodiments, the controller 142 can include an input/output (IO) processor 202 that analyzes an IO workload 201 received by the storage array 102 of FIG. 1. Specifically, the IO processor 202 can analyze IO metadata from each IO RW request 203 corresponding to the IO workload 201. For example, the IO metadata can include target RW address, IO size, IO type, and the like. Further, the IO processor 202 can identify one or more patterns corresponding to the IO workload 201, or the corresponding IO RW requests 203 based on the historical and current IO workloads. Additionally, the IO processor 202 can maintain a workload patterns log (e.g., a searchable data structure) in local memory 210 that identifies each IO workload's corresponding patterns. Further, the IO processor 202 can include logic, circuitry, and hardware having neural network architecture that can analyze IO metadata to identify the patterns.

In addition, the IO processor 202 can analyze IO read requests corresponding to the IO workload 201. Specifically, the IO processor 202 can analyze IO read requests over one or more intervals corresponding to the IO workload 201. Additionally, the read request analyzer 204 can track the last read of a virtual device's logical segments (e.g., extent, track, sector, or LBA). For example, the read request analyzer 204 can obtain a last-read timestamp from each logical segment's corresponding metadata. Further, the read request analyzer 204 can establish a last-read histogram corresponding to the virtual device for each interval. For instance, the last-read histogram can group the logical segments of the virtual device into time-range bins based on each logical segment's last-read timestamp.

In embodiments, the controller 142 can include a skew analyzer 204 that can generate a read capacity skew model corresponding to the virtual device for each interval. Specifically, for each interval, the skew analyzer 204 can obtain the virtual device's corresponding last-read histogram from local memory 210 to generate a read capacity skew model. Each read capacity skew model can define a frequency of IO read requests of the IO workload 201 targeting each logical segment of the virtual device. The read capacity skew models can also define each logical segment's (e.g., extent's) access percent (e.g., read percent). For example, a logical segment's read percent can correspond to a ratio of its corresponding read access requests and the total reads of the virtual device during an interval.

In embodiments, the controller 142 can include a skew forecaster 206 that can generate read skew prediction models of the virtual device and its logical segments. For instance, for each interval, the skew forecaster 206 can ingest a corresponding read capacity skew model of the virtual device. Specifically, the skew forecaster 206 can include logic, circuitry, and hardware with an architecture designed to perform seasonal trend decomposition of read capacity skew models.

Further, a virtual device's corresponding read skew prediction model can forecast read capacity skews corresponding to the virtual device and its logical segments. Additionally, the read skew prediction model can include a forecast confidence for each forecasted read capacity skew. For example, the architecture of the skew forecaster 206 can include a design that performs the seasonal trend decomposition using locally weighted regression and scatterplot smoothing (LOESS) to determine the forecasted confidences. In addition, for each interval, the skew forecaster 206 can dynamically establish a read anomaly threshold using the forecasted confidences. Accordingly, for each interval, the skew forecaster 206 can generate unique read anomaly thresholds for each virtual device.

In embodiments, the controller 142 can include a data theft manager 208 that monitors access requests 203 of the IO workload 201. Specifically, for each interval, the data theft manager 208 can track the number of reads of each virtual device and its logical segments. Further, for each interval, the data theft manager 208 can analyze the number of reads using each virtual device's corresponding read skew prediction model. For example, the data theft manager 208 can compare the number of reads and the read anomaly threshold of the read skew prediction model. Based on the comparison, the data theft manager 208 can determine a likelihood of a data theft occurrence. If the likelihood exceeds a threshold, the data theft manager 208 can perform a data theft mitigation action. For example, a data theft mitigation action can include issuing a data theft alert or disabling the virtual device corresponding to the data theft occurrence.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 3:
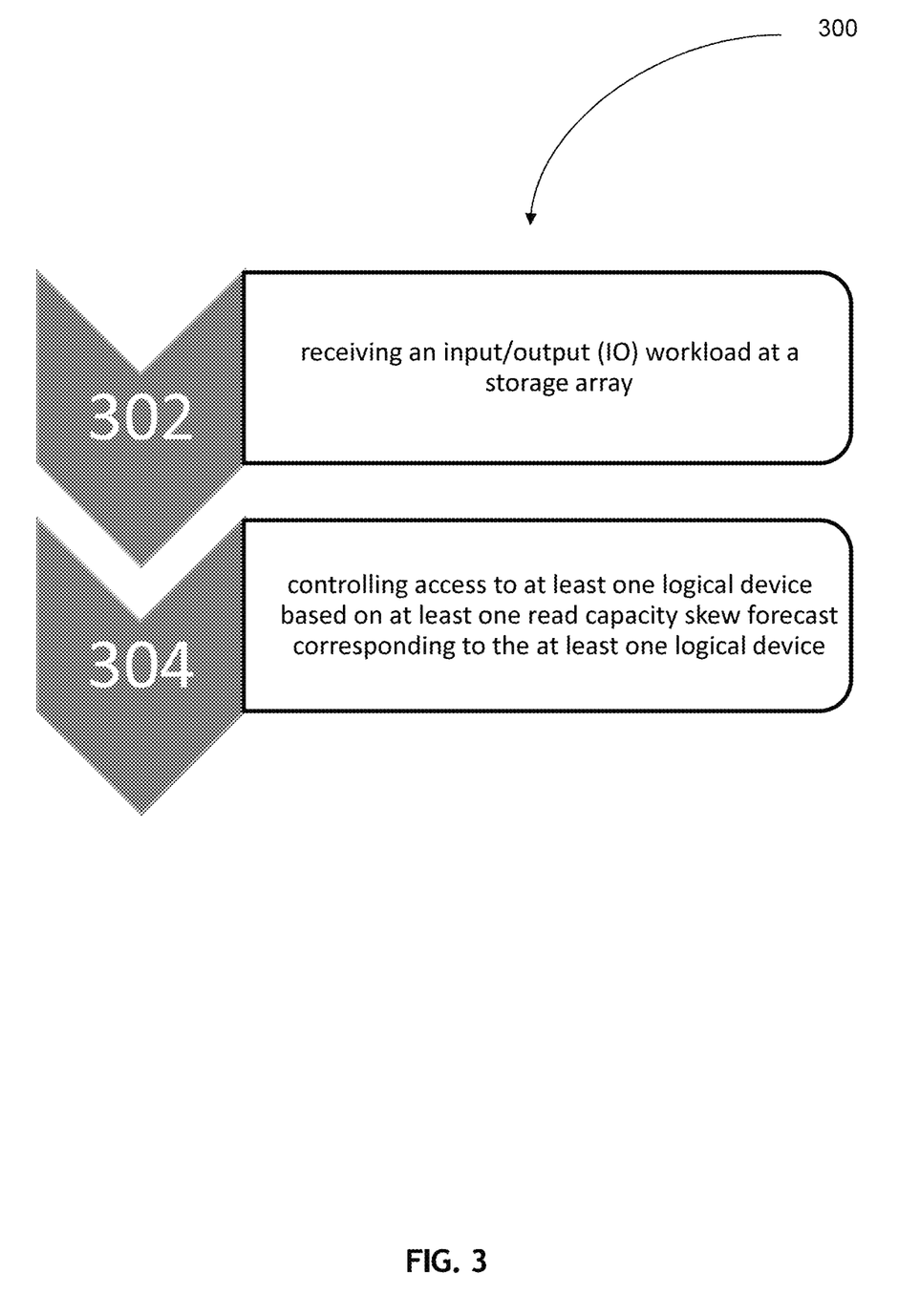
FIG. 3 is a flow diagram of a method for performing read-skew-based data theft mitigation in accordance with embodiments of the present disclosure.

Regarding FIG. 3, a method 300 relates to performing read-skew-based data theft mitigation. In embodiments, the controller 142 of FIG. 1 can perform all or a subset of operations corresponding to the method 300.

For example, the method 300, at 302, can include receiving an input/output (IO) workload at a storage array. Further, at 304, the method 300 can include controlling access to at least one logical device based on at least one read capacity skew forecast corresponding to the at least one logical device.

Further, each operation can include any combination of techniques implemented by the embodiments described herein. Additionally, one or more of the storage array's components 108 can implement one or more of the operations of each method described above.

Figure 4:
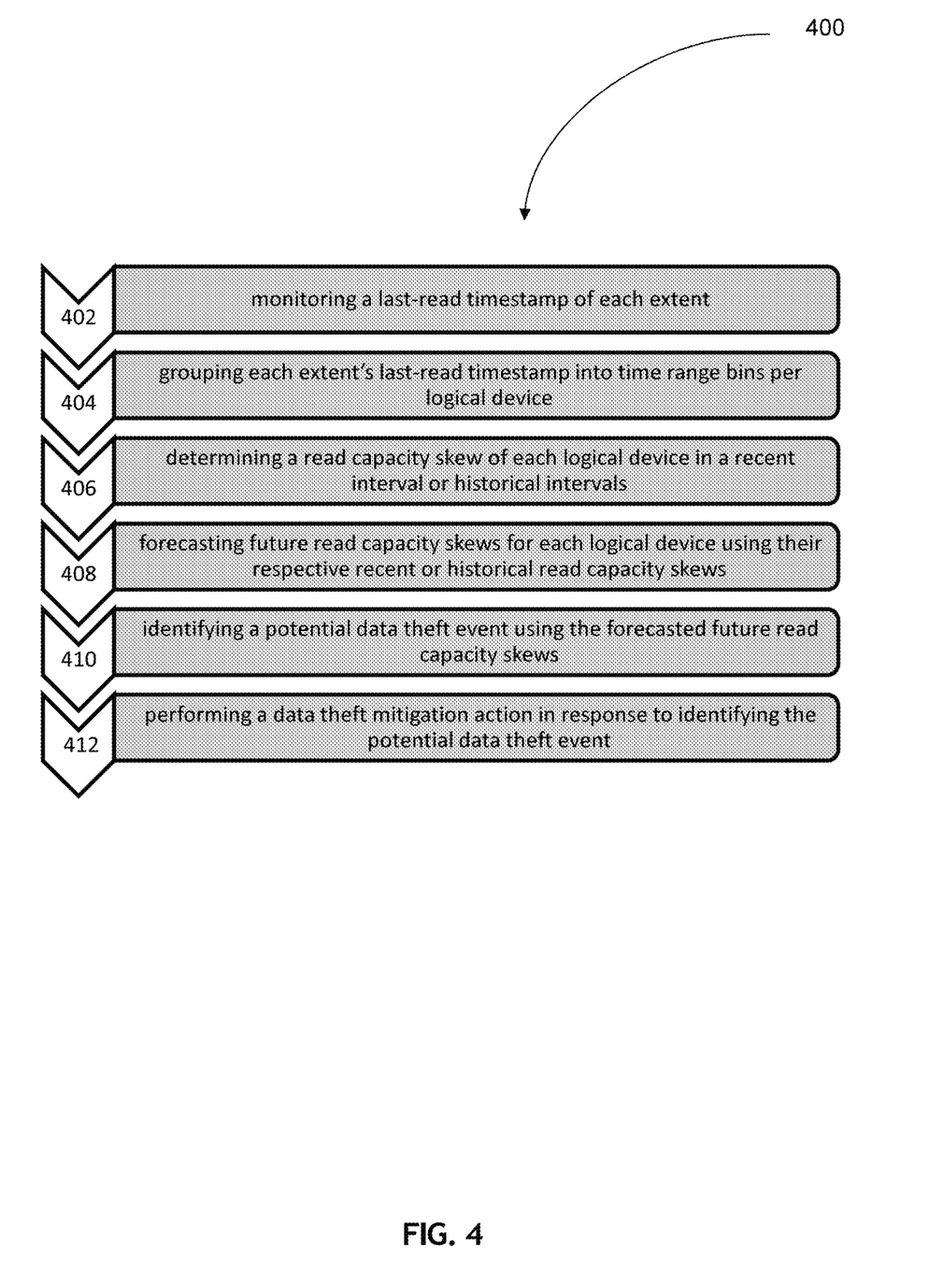
FIG. 4 is a flow diagram of a method for controlling access to a logical device per embodiments of the present disclosure.

Regarding FIG. 4, a method 400 relates to controlling access to a logical storage device. In embodiments, the controller 142 of FIG. 1 can perform all or a subset of operations corresponding to the method 400.

For example, the method 400, at 402, can include monitoring a last-read timestamp of each extent. Additionally, at 404, the method 400 can include grouping each extent's last-read timestamp into time range bins per logical device. Further, the method 400, at 406, can include determining a read capacity skew of each logical device during a recent interval or historical intervals. In addition, at 408, the method 400 can include forecasting future read capacity skews for each logical device using their respective recent or historical read capacity skews. Using the forecasted future read capacity skews, the method 400, at 410, can include identifying a potential data theft event. Further, the method 400, at 412, can include performing a data theft mitigation action in response to identifying the potential data theft event.

Further, each operation can include any combination of techniques implemented by the embodiments described herein. Additionally, one or more of the storage array's components 108 can implement one or more of the operations of each method described above.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving an input/output (IO) workload at a storage array;
   generating a read capacity skew forecast using time series decomposition of historical and current read capacity skews corresponding to at least one logical device;
   establishing a forecast confidence of the read capacity skew forecast for at least one interval;

dynamically generating a read skew threshold based on the forecast confidence; and
controlling access to the at least one logical device by:
  identifying a current read skew of the at least one logical device, and
  disabling the at least one logical device when the current read skew exceeds the read skew threshold.

2. The method of claim 1, further comprising:
determining activity trends of the at least one logical device based on historical and current access requests of the at least one logical device.

3. The method of claim 2, further comprising:
identifying a last-read time of each extent of the least one logical device, wherein the extent includes at least one track of address spaces corresponding to the least one logical device.

4. The method of claim 3, further comprising:
grouping the last-read time of each extent into time-range bins corresponding read access times of the least one logical device.

5. The method of claim 4, further comprising:
determining a read capacity skew of the at least one logical device during at least one interval.

6. The method of claim 5, further comprising:
generating the at least one read capacity skew forecast based on historical and current read capacity skews of the least one logical device.

7. The method of claim 1, further comprising:
dynamically generating a read skew threshold based on the forecast confidence.

8. The method of claim 7, further comprising:
identifying a current read skew of the least one logical device; and
disabling the at least one logical device if the current read skew exceeds the read skew threshold.

9. A system with a processor and memory, the system configured to:
receive an input/output (IO) workload at a storage array;
generate a read capacity skew forecast using time series decomposition of historical and current read capacity skews corresponding to at least one logical device;
establish a forecast confidence of the read capacity skew forecast for at least one interval;
dynamically generate a read skew threshold based on the forecast confidence; and
control access to the at least one logical device by:
  identifying a current read skew of the at least one logical device, and
  disabling the at least one logical device when the current read skew exceeds the read skew threshold.

10. The system of claim 9, further configured to:
determine activity trends of the at least one logical device based on historical and current access requests of the at least one logical device.

11. The system of claim 10, further configured to:
identify a last-read time of each extent of the least one logical device, wherein the extent includes at least one track of address spaces corresponding to the least one logical device.

12. The system of claim 11, further configured to:
group the last-read time of each extent into time-range bins corresponding read access times of the least one logical device.

13. The system of claim 12, further configured to:
determine a read capacity skew of the at least one logical device during at least one interval.

14. The system of claim 13, further configured to:
generate the at least one read capacity skew forecast based on historical and current read capacity skews of the least one logical device.

15. The system of claim 9, further configured to:
dynamically generate a read skew threshold based on the forecast confidence.

16. The system of claim 15, further configured to:
identify a current read skew of the least one logical device; and
disable the at least one logical device if the current read skew exceeds the read skew threshold.

* * * * *